United States Patent
Horney et al.

[11] Patent Number: 5,860,685
[45] Date of Patent: Jan. 19, 1999

[54] FRESH AIR DUCT SYSTEM FOR A VEHICLE

[75] Inventors: Kenneth Horney, Harrison Township; Thomas M. Knowles, Sterling Heights, both of Mich.

[73] Assignee: Chrysler Corporation, Auburn Hills, Mich.

[21] Appl. No.: 854,059

[22] Filed: May 8, 1997

[51] Int. Cl.⁶ .................................................. B60R 19/48
[52] U.S. Cl. ..................... 293/113; 293/117; 296/208; 180/68.3; 180/68.1
[58] Field of Search .................. 180/68.3, 68.2, 180/68.1; 293/117, 113, 122; 296/194, 208

[56] References Cited

U.S. PATENT DOCUMENTS

| | | |
|---|---|---|
| 2,104,182 | 1/1938 | Best . |
| 2,358,663 | 9/1944 | Scott-Iversen . |
| 2,759,755 | 8/1956 | Johnson . |
| 4,516,650 | 5/1985 | Yamaguchi . |
| 4,562,895 | 1/1986 | Kirchweger . |
| 4,610,326 | 9/1986 | Kirchweger et al. . |
| 4,653,788 | 3/1987 | Di Giusto . |
| 4,902,059 | 2/1990 | Tritton ....................................... 293/117 |
| 4,984,350 | 1/1991 | Hayashi ............................... 180/68.3 X |
| 5,014,816 | 5/1991 | Dear et al. ............................... 181/289 |
| 5,141,068 | 8/1992 | Mendicino . |
| 5,251,712 | 10/1993 | Hayashi et al. . |
| 5,302,783 | 4/1994 | Sadr et al. ............................... 181/243 |

FOREIGN PATENT DOCUMENTS

| | | |
|---|---|---|
| 535406A1 | of 0000 | European Pat. Off. . |
| 2616403 | of 0000 | France . |
| 587696 | 1/1959 | Italy ....................................... 180/68.1 |
| 1249519 | 10/1989 | Japan . |

*Primary Examiner*—D. Glenn Dayoan
*Assistant Examiner*—Jason Morrow
*Attorney, Agent, or Firm*—Kenneth H. Maclean

[57] ABSTRACT

A fresh air duct system for a vehicle that includes an engine air cleaner with an attached conduit for passing fresh air into the air cleaner. The system includes a bumper beam that has elongated upper and lower air passageways that can be in fluid flow communication with the conduit for defining an air flow path between the air cleaner and the passageways. Fresh air can be introduced into the air duct system such that at least one of the air flow passageways can simultaneously act as a sound resonator and a resonator tuner.

14 Claims, 2 Drawing Sheets

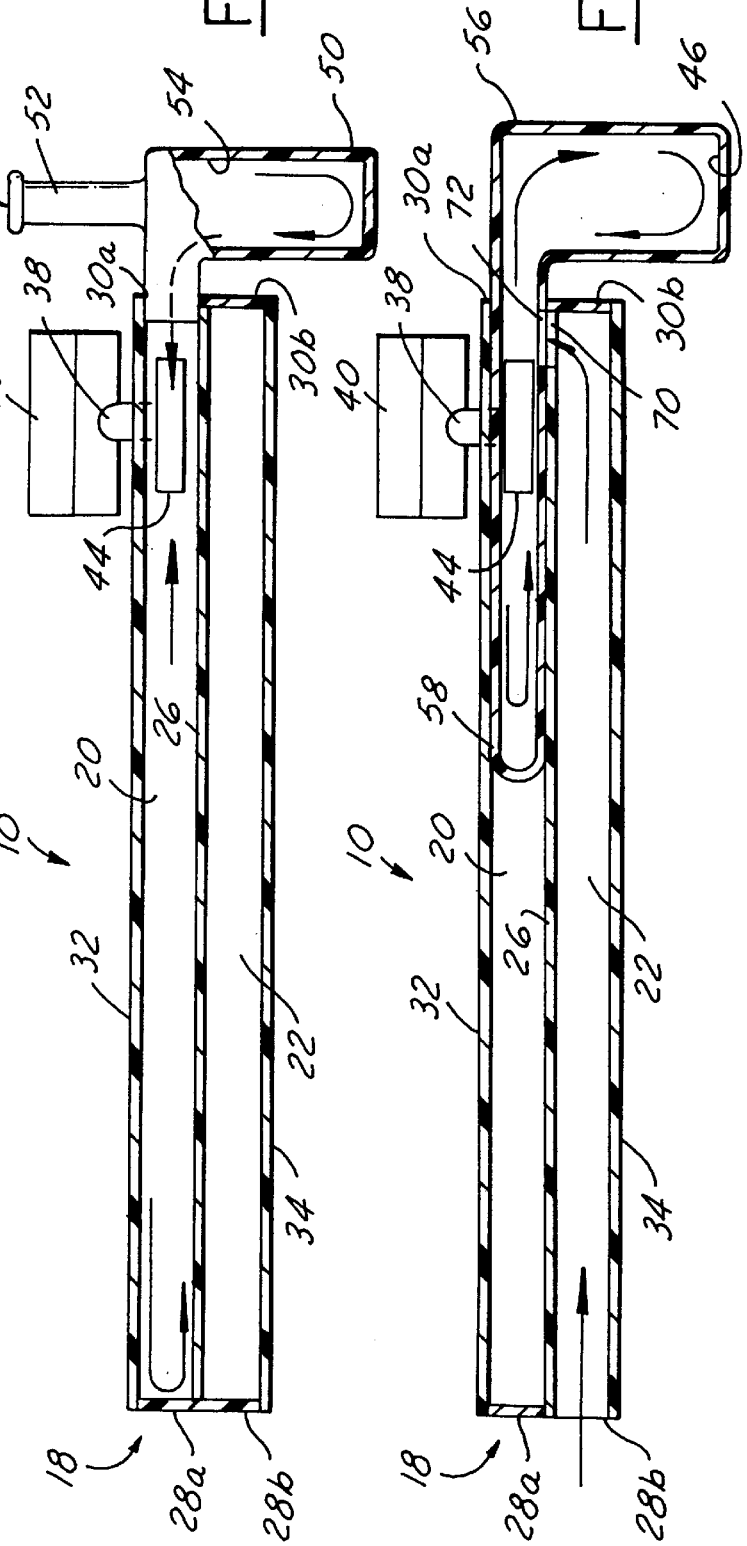

FRESH AIR DUCT SYSTEM FOR A VEHICLE

BACKGROUND

1. Field of the Invention

This application relates to a fresh air introduction systems for a vehicle and, specifically, to an air duct system formed in a vehicle bumper for introducing fresh air to a vehicle's engine compartment via an air cleaner.

2. Description of the Related Art

It is known to provide an air duct in a vehicle bumper for directing a flow of air to a vehicle's engine air cleaner, radiator, or front brakes. A typical engine compartment in a modern vehicle has become increasingly pressed for space at least partially because of structural design constraints, namely desirable low hoodlines. Accordingly, it has become very difficult to design an air intake passageway to the engine compartment and the engine with sufficient flow capacity and a correct length dimension so as to provide a desired sound attenuation of engine noise. In addition, the design must satisfy any required thermodynamic expectations and requirements of the powertrain system as it is known that the engine may suffer a loss of power if the air passageway is inadequate.

It is therefore desirable to have a fresh air duct system for a vehicle that is contained within a vehicle bumper thereby increasing space within the engine compartment for other components and thereby providing an adequately long passageway for necessary sound attenuation. It is also desirable to have a fresh air duct system for a vehicle that is adaptable by simultaneously serving as a sound resonator, resonator tuner, and a source of fresh air.

SUMMARY OF THE INVENTION

The present invention eliminates the oversights, difficulties, and disadvantages of the prior art by providing a fresh air duct system for a vehicle that includes an air cleaner with an associated and attached conduit which has an outlet for passing fresh air into the air cleaner of the engine. The air duct system includes a vehicle bumper including a beam member mounted to the vehicle structure. The beam member has an upper and lower air passageway therein. The upper passageway is defined by an elongated upper wall, an elongated cross-member portion, and axially opposed first and second end cap portions each attached to the upper wall and the cross-member. The lower passageway is defined by the cross-member, an elongated lower wall, and axially opposed first and second end cap portions each attached to the lower wall and the cross-member. The present invention further provides an elongated bumper abutment plate member, to which the beam is secured. The abutment member has an aperture extending through the member in alignment with an aperture disposed in the upper passageway. The duct or conduit to the engine air cleaner is attached to the abutment plate so as to receive a flow of air from at least the upper passageway aperture and the aperture in the abutment plate member, thus defining an air flow path to the air cleaner.

In a first embodiment of the subject air duct system an outlet aperture is disposed in both the upper and lower passageways through the abutment plate member, and a connection opening is formed through the cross-member adjacent to the second end caps to connect the upper and lower passageways. Fresh air is introduced into the air duct system through an opening formed in the first end cap of the lower passageway so that air flows first through the length of the lower passageway and then a portion can pass through the aperture formed in the lower passageway. The remainder then passes through the connection opening and through the aperture formed in the upper passageway. A volume of air is present in the entire length of the upper passageway thereby forming a sound resonator or resonator tuner to reduce noise which might enter the duct system, particularly from the engine. As can be understood, the upper passageway simultaneously acts as a sound resonator and a resonate tuner.

In a second embodiment of the subject air duct system, an outlet opening is formed through the abutment plate member from the upper passageway adjacent a second end cap and a connection opening is formed through the cross-member adjacent to the first end cap to connect the upper and lower passageways. Fresh air is introduced into the air duct system through an opening formed in the second end cap of the lower passageway so that air flows first through the length of the lower passageway (approximate width of the bumper) and then through the connection opening into the upper passageway. The air then flows through the entire length of the upper passageway to the outlet opening and the engine's air cleaner. The passageways can act as a contiguous sound resonator as well as a passageway for fresh air.

In a third embodiment of the subject air duct system, an outlet aperture is disposed in the upper passageway through the abutment member and attached to an inlet of the engine air cleaner. A separate pass-through, sound resonator is attached to the beam and includes a container through which air flows. The container has a neck portion adapted to receive fresh air and pass it into the container. The container also has an outlet portion operatively connected to the upper passageway so that air flows from the container to the outlet aperture. Practically the entire length of the upper passageway is filled with air which act as a resonate tuner as well as an air passageway.

Finally, in a fourth embodiment of the subject air duct system, an outlet aperture is disposed in the upper passageway through the abutment member and connecting with the inlet of the engine air cleaner. Fresh air is introduced into the duct system through an opening in the first end cap portion of the lower passageway so that air flows through the length of the lower passageway and then through a connecting opening in the cross-member positioned adjacent the second end cap into the upper passageway. A separate sound resonator is operatively connected and attached to the upper passageway. The resonator includes an enclosure or container in which air may pass. The container has a combination inlet/outlet opening communicating with the upper passageway adjacent to the outlet aperture to the air cleaner. The resonator also has an extension which protrudes into the upper passageway. The extension has a closed end spaced from the outlet to the air cleaner and an opening in alignment with the connecting opening between the lower and upper passageways. Accordingly, air flows the length of the lower passageway, through the connecting opening and the opening in the extension, and then into the outlet to the air cleaner. Volumes of air in the container and in adjacent the closed end portion of the extension serve as an additional source of air during transient conditions and as resonate tuners to dampen engine generated noise.

Other objects, features and advantages of the present invention will become apparent by reference to the following detailed description when considered in conjunction with the accompanying drawings.

BRIEF DESCRIPTION OF THE DRAWINGS

FIG. 3 is a cross sectional view of a second embodiment of the fresh air duct system of the present invention.

FIG. 4 is a cross sectional view of a third embodiment of the fresh air duct system of the present invention.

FIG. 5 is a cross sectional view of a fourth embodiment of the fresh air duct system of the present invention.

DESCRIPTION OF THE PREFERRED EMBODIMENT(S)

Figure 1:
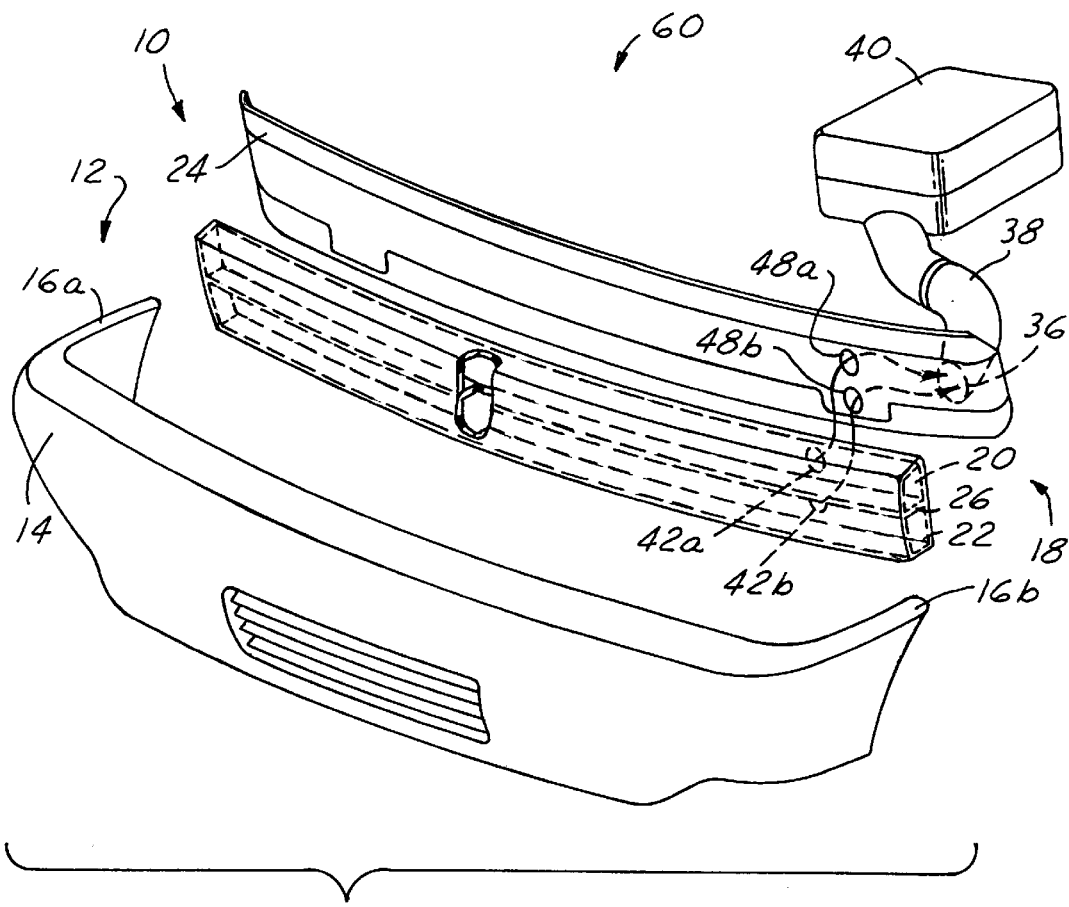
FIG. 1 is an perspective and exploded view of a vehicle bumper and a fresh air duct system of the present invention.

Looking to FIG. 1, a fresh air duct system 10 is shown in the form of a special bumper assembly 12 associated with a vehicle 60 (partially shown). The parts of the vehicle 60 include an engine air cleaner 40 which has an associated inlet conduit 38 for passing fresh air therein. The bumper assembly 12 includes a bumper fascia (outer skin portion) 14 which has generally rounded end portions 16a and 16b. The bumper assembly 12 further includes a tubular and elongated beam member 18 defining an upper air passageway 20 and a lower air passageway 22. The beam has a rear wall 23 extending adjacent to an elongated abutment plate member 24. A cross member 26 extends in substantial parallelism and midway between the upper and lower walls of the beam.

Referring to FIG. 2–5, the upper air passageway 20 is defined between an elongated upper wall 32 and the elongated cross member 26. The length in an axial direction is defined between first and second end portions. The lower air passageway 22 is defined between the cross member 26 and the elongated lower wall 34. The length in the axial direction is defined between first and second end portions. In the four embodiments as shown in FIGS. 2–5, the first and second end portions of the beam which define the passageways have end caps 28a and 30a, and 28b and 30b, respectively attached to the beam. Note that an end cap is omitted where an opening is intended for admitting air into the duct system or for another purpose as will be explained below. Thus where appropriate, the first and second end caps are each attached to the upper wall 32, the front and rear walls, the abutment plate member 24, and the cross member 26.

Figure 2:
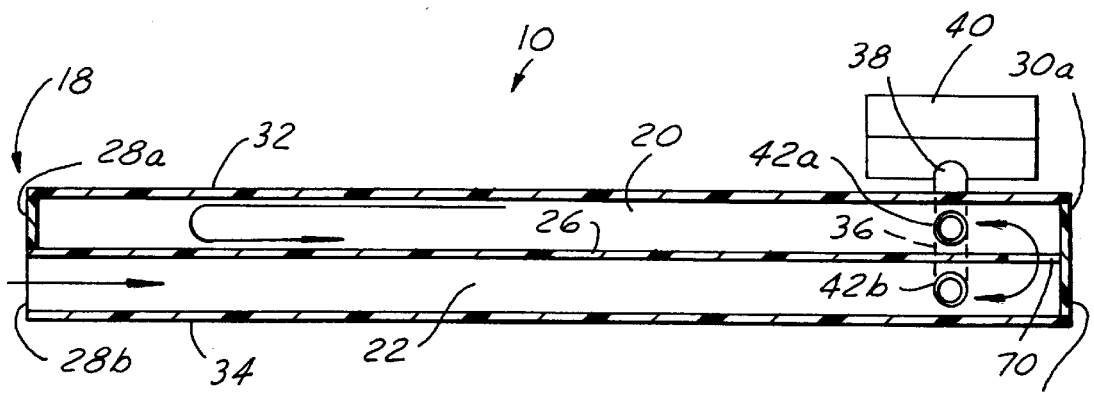
FIG. 2 is a cross sectional view of a first embodiment of the fresh air duct system of the present invention.

As shown in the first embodiment of FIG. 2, an outlet aperture 42a is formed through rear wall 23 in the upper passageway 20 and an outlet aperture 42b is likewise formed through the rear wall 23 in the lower passageway 22. Outlets 42a and 42b are adapted for being operatively connected to the inlet of an engine air cleaner. Two apertures 48a and 48b extend through the bumper abutment plate 24 to which the beam 18 is secured. Aperture 48a is in axial alignment with the outlet opening 42a to the upper air passageway 20. Likewise, aperture 48b is in axial alignment with outlet opening 42b to the lower passageway 22. A connecting opening 70 is also formed through cross member 26 between passageways 20 and 22 and adjacent to the second end caps 30a and 30b. The conduit 38 of the engine air cleaner 40 is attached to abutment plate 24. The conduit 38 is fluidly communicated with the outlet apertures 48a and 48b of abutment plate 24 for receiving the air flow from outlets 42a and 42b of passageways 20, 22, respectively.

In preferred embodiments, the first end caps 28a and 28b at one end of the beam 18 are overlaid or covered by rounded end portion 16a of the fascia 14 and the second end caps 30a and 30b at the opposite end of the beam 18 are overlaid or covered by rounded side portion 16b of the fascia 14. The covering of the end caps is such that the end caps are hidden from view but with sufficient spacing for introduction of fresh air into an opening formed by the absence of or through an end cap. The fascia 14 of bumper 12 is preferably made of an energy absorbing foam core surrounding the beam 18 and a decorative skin.

In the first embodiment shown in FIG. 2, fresh air is introduced into the lower passageway 22 of the air duct system 10 through an opening formed either through an opening in the first end cap 28b or by the omission of the end cap 28b. Air flows through the length of the lower passageway 22 and then a portion of the air flow passes into outlet aperture 42b to the engine air cleaner 40 through conduit 38. The remainder of the air flow passes through the connecting opening 70 in cross member 26 into the first passageway 20. Air then passes into outlet aperture 42a which is disposed in the upper passageway 20 and through conduit 38 to the engine air cleaner 40. Some air flow can occur through the length of the upper passageway 20 as denoted by numeral 51. This flow is deflected by first end cap 28a and rebounds back toward the outlet aperture 42a. The lower passageway 22 primarily serves as a fresh air passageway while air flow through the upper passageway is not large. The relatively still volume of air in the upper passageway 20 and to the left of outlet aperture 42a provides a surplus supply of air when needed during transient engine operations but primarily serves as a sound resonator to attenuate engine source noise. The passageways 20, 22 are about forty-eight inches in length when associated with a typical vehicle application. This length of air in the upper passageway 20 acts to decrease noises emitted by the engine and transmitted therefrom through the air cleaner 40 and conduit 38. Sound attenuation occurs in the upper passageway 20 when the sound waves travels the length of the upper passageway 20 and rebound which tends to cancel other sound waves passing in the opposite direction.

In FIG. 3, a second embodiment of the invention is shown. A generally rectangular shaped aperture 44 is located in the upper passageway 20 and connected to the conduit 38 in place of the two outlet apertures 42a and 42b in FIG. 1. The cross member 26 has a connecting opening 68 formed between passageways 20, 22 at the opposite end portion of the duct assembly adjacent to the first end caps 28a and 28b. An aperture is formed through the elongated abutment plate 24 which overlies the rear wall 23 of the beam 18 and is aligned with aperture 44 to receive a flow of air therefrom. The conduit 38 and air cleaner 40 are serially connected to the aperture in the plate member 24 so as to pass air to the associated engine. In this second embodiment, fresh air is drawn into the air duct system 10 through an inlet formed either through an opening formed in the second end cap 30b or by omission of the end cap. Air then travels the length of lower passageway 22 and then through the connecting opening 68 and into the upper passageway 20. After flowing through upper passageway 20, the flow enters outlet aperture 44 and into conduit 38 and air cleaner 40 to the engine. Accordingly, a contiguous fresh air passageway runs the lengths of the upper and lower passageways 20 and 22, respectively. Simultaneously, the passageways 20 and 22 serve as a sound resonator to attenuate engine noises.

In FIG. 4, a third embodiment of the invention is shown. The duct system has a generally rectangular aperture 44 disposed in the upper passageway 20 which is in axial alignment with an aperture through the abutment plate 24. The conduit 38 and the inlet of the air cleaner 40 are in serial fluid communication with the outlet aperture 44 to complete an air flow path between the upper passageway 20 and the air cleaner 40. The embodiment shown in FIG. 4 provides an enclosure 50 in the form of a hollow thin-walled container which serves as an air inlet to the passageway 20 and acts as a sound attenuating resonator. The enclosure or container 50 has a bottle neck portion 52 through which fresh air is introduced into the to the interior space 54. Container 50 also has a tubular outlet portion 55 which is adapted to be insertably fitted into the rightward end portion of the beam 18 adjacent the outlet aperture 44. The resultant flow of fresh air into the duct system primarily passes directly from the neck portion 52 to the outlet aperture 44 but a portion flows downward and then upward as indicated by the arrow labeled 57. This indirect flow also serves to decrease the passage of engine noise to the inlet neck 52. Air passes through outlet portion 55 into upper passageway 20. A portion passes directly into the outlet aperture 44 and the remainder passes through the upper passageway, then rebounds from first end cap 28*a* and subsequently travels back to the outlet aperture 44 as indicated by the arrow labeled 59. As explained in connection with the other embodiments, this volume of air to the left of outlet aperture 44 serves as a sound resonator to attenuate engine noise.

In FIG. 5, a fourth embodiment of the invention is shown. The duct system has an outlet aperture 44 disposed in upper passageway 20 located at the rightward end portion similar to the aforedescribed third embodiment. A connecting opening 70 extending through the cross member 26 is located adjacent the rightward end portion and fluidly interconnects the upper and lower passageways 20, 22. As in the second and third embodiments, an outlet aperture through the abutment plate member 24 is aligned with outlet aperture 44 which extends through the rear wall 23 of the beam 18. This outlet aperture is in axial alignment with the outlet aperture 44 of the beam member that is disposed in the upper passageway 20. Both outlet apertures are connected to the conduit 38 and air cleaner 40. An opening for introduction of fresh air into the duct system is formed at the leftward end portion of the beam 18 by either an opening in the end cap member 28*b* or omission of the end cap. In this way, air flows from the inlet through the lower passageway 22 and the connecting opening 70.

As in the third embodiment, a thin-walled and hollow enclosure or container 56 is supported at the rightward end portion of the beam structure 18. The enclosure 56 defines an interior space 46 and has a generally tubular outlet portion 62. The tubular outlet portion 62 of the container 56 extends into the upper passageway 20 and has a closed end portion or extension 58. The extension 58 is fluidly communicated to the interior 46 of the enclosure or container 46. Extension 58 further includes an opening 72 that is in axial alignment with the connecting opening 70 in cross member 26 and has an outlet opening aligned with the aperture 44 in the beam structure. Fresh air flows into the air duct system 10 through the leftward opening and then through the lower passageway 22. The air then passes through the aligned apertures 70, 72 into the interior of the extension 58 of the container 56. Next, the a primary portion of the air flows directly through the aperture 44 into the conduit 38 and air cleaner 40. The remainder flows into the extent and into the interior space 46 before eventually passing through the outlet aperture 44. The container space 46 and the interior of the extension 58 act as resonator tuners to attenuate engine noise. The volume and dimension (length of the extension) can be readily changed to adjust the frequencies of the particular sounds that will be most affected by attenuation of the resonator 56.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A fresh air duct system for a vehicle that includes an air cleaner with an attached inlet conduit having an opening for passing fresh air into the air cleaner, the vehicle including a bumper mounted thereon and the system comprising:

an elongated beam contained in the bumper and having an upper air passageway and a lower air passageway, the upper air passageway being defined by an elongated upper wall, an elongated cross-member, and axially opposed first and second end caps each attached to the upper wall and the cross-member, the lower air passageway being defined by the cross-member, an elongated lower wall, and axially opposed first and second end caps each attached to the lower wall and the cross-member, an outlet aperture disposed in the upper passageway, and a connecting opening between the passageways disposed in the cross-member adjacent to the first end caps;

a bumper abutment plate, to which the beam is secured, having an aperture extending therethrough in axial alignment with the aperture disposed in the upper passageway, the conduit opening being in serial fluid communication with the aperture in the abutment plate and the upper passageway aperture for defining an air flow path between the air cleaner and the upper passageway; and wherein fresh air is introduced into the air duct system through an opening in the second end cap of the lower passageway, travels the length of the lower passageway, passes through the passageway connection opening, and then travels the length of the upper passageway before entering the conduit and the attached air cleaner.

2. The fresh air duct system of claim 1 wherein the upper and lower passageways act as a contiguous sound resonator.

3. The fresh air duct system of claim 1 wherein the upper and lower passageways act as a contiguous fresh air passageway.

4. The fresh air duct system of claim 1 wherein the upper and lower passageways simultaneously act as a contiguous sound resonator and a fresh air passageway.

5. A fresh air duct system for a vehicle that includes an air cleaner with an attached conduit having an inlet opening for passing fresh air into the air cleaner, the vehicle including a bumper mounted thereon and the system comprising:

the bumper including a beam defining an upper air passageway and a lower air passageway, the upper air passageway being defined by an elongated upper wall, an elongated cross-member, and axially opposed first and second end caps each attached to the upper wall and the cross-member, the lower air passageway being defined by the cross-member, an elongated lower wall, and axially opposed first and second end caps each attached to the lower wall and the cross-member, an outlet aperture disposed in the upper and lower passageways, and a connecting opening between said passageways disposed in the cross-member adjacent to the second end caps;

a bumper abutment plate, to which the beam is secured, having two apertures extending therethrough, one aperture in axial alignment with the aperture disposed in the upper passageway, and one aperture in axial alignment with the aperture disposed in the lower passageway, the inlet conduit of the air cleaner being attached to the abutment plate in fluid flow communication with the outlet apertures disposed in the abutment plate and each aperture in the upper and lower passageways for defining an air flow path between the air cleaner and the upper and lower passageways; and wherein fresh air is introduced into the air duct system through an opening in the first end cap of the lower passageway and travels the length of the lower passageway before passing through: the aperture disposed in the lower passageway, the passageway connection opening, the aperture disposed in the upper passageway, and traveling the length of the upper passageway before deflecting off the first end cap of the upper passageway and back toward the conduit and attached air cleaner.

6. The fresh air duct system of claim 5 wherein the lower passageway acts as a fresh air passageway.

7. The fresh air duct system of claim 5 wherein the upper passageway acts as a sound resonator.

8. The fresh air duct system of claim 5 wherein the upper passageway acts as a resonator tuner.

9. The fresh air duct system of claim 5 wherein the upper passageway acts as a fresh air passageway.

10. The fresh air duct system of claim 5 wherein the upper passageway simultaneously acts as a sound resonator, a resonator tuner, and a fresh air passageway.

11. A fresh air duct system for a vehicle that includes an air cleaner with an attached inlet conduit having an opening for passing fresh air into the air cleaner, the vehicle including a bumper mounted thereon and the system comprising:

a beam contained in the bumper and having an upper air passageway and a lower air passageway, the upper air passageway being defined by an elongated upper wall, an elongated cross-member, and axially opposed first and second end caps each attached to the upper wall and the cross-member, the lower air passageway being defined by the cross-member, an elongated lower wall, and axially opposed first and second end caps each attached to the lower wall and the cross-member, and an outlet aperture disposed in the upper air passageway;

a bumper abutment plate to which the beam is secured, having an outlet aperture extending therethrough in axial alignment with the outlet aperture disposed in the upper passageway, the conduit opening being in serial fluid communication with the aperture in the abutment plate and the upper passageway aperture for defining an air flow path between the air cleaner and the upper passageway;

a sound resonator enclosure with an inlet portion and an outlet portion for air attached to the beam member, said enclosure defining a container for recirculation of the fresh air; and wherein fresh air is introduced into the air duct system through the inlet portion of the enclosure and travels into the container, partially into the inlet conduit to the air cleaner that is in fluid flow communication with the upper passageway, and partially through the length of the upper passageway before deflecting off the first end cap of the upper passageway and back toward the conduit inlet and attached air cleaner.

12. The fresh air duct system of claim 11 wherein the upper passageway acts as a tuner for the pass-through resonator.

13. A fresh air duct system for a vehicle, the vehicle having a bumper mounted thereon, the system comprising:

an air cleaner having a fresh air conduit attached thereto the conduit having an opening for passing fresh air into the air cleaner;

a beam contained in the bumper and having an upper air passageway and a lower air passageway, the upper air passageway being defined by an elongated upper wall, an elongated cross-member, and axially opposed first and second end caps each attached to the upper wall and the cross-member, the lower air passageway being defined by the cross-member, an elongated lower wall, and axially opposed first and second end caps each attached to the lower wall and the cross-member, an aperture disposed in the upper passageway, and a passageway connection opening disposed in the cross-member adjacent to the second end caps;

a bumper abutment plate, to which the beam is secured, having an outlet aperture extending therethrough in axial alignment with the aperture disposed in the upper passageway, the inlet opening of the air cleaner conduit being attached to the abutment plate and in fluid flow communication with the aperture disposed in the abutment plate and the aperture disposed in the upper passageway for defining an air flow path between the air cleaner and the upper passageway;

a sound resonator enclosure, attached to the beam, defining a container for recirculation of fresh air, said enclosure defining a hollow extension attached to the container and protruding into the upper passageway, and an opening in said extension in axial alignment with the connection opening between said passageways; and wherein fresh air is introduced into the air duct system through an inlet opening in the first end cap of the lower passageway, travels the length of the lower passageway, passes through the connecting opening and the extension opening, passes partially into the resonator enclosure where the fresh air is recirculated, partially into the inlet conduit for the air cleaner that is in fluid flow communication with the upper passageway, and then passing the length of the upper passageway before deflecting off the first end cap of the upper passageway and back toward the conduit and attached air cleaner.

14. The fresh air duct system of claim 11 wherein the extension acts as a tuner for the resonator.

* * * * *